Oct. 28, 1952        J. KRAL        2,615,226
TURN-IN STUD MOUNTING MOLDING SNAP FASTENER
Filed May 12, 1948
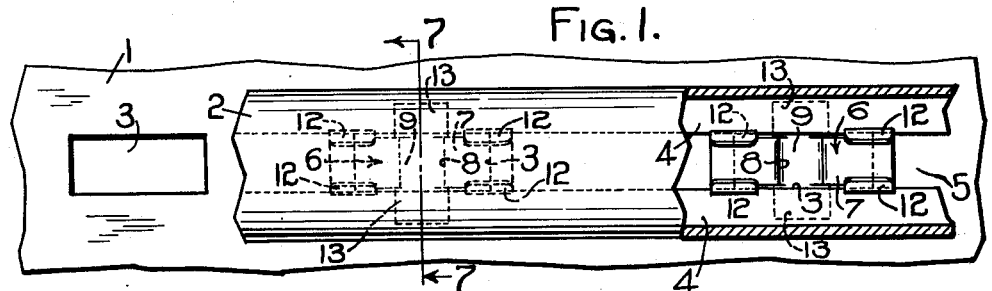
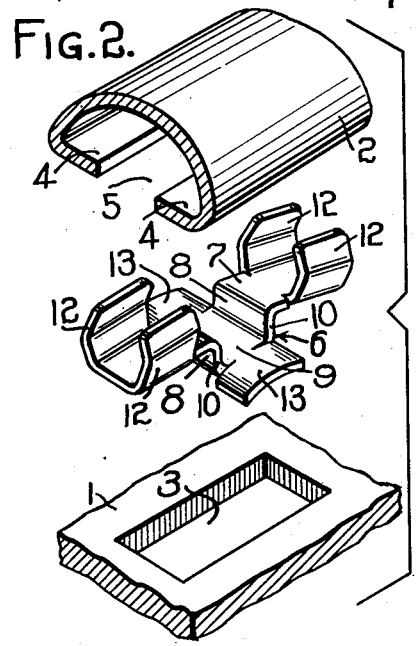
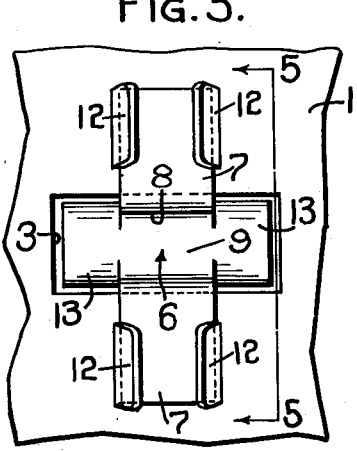
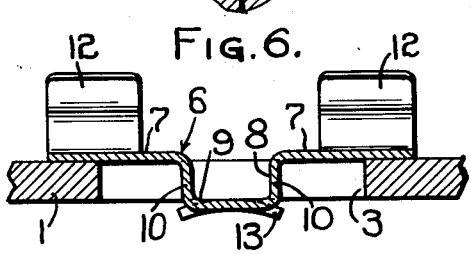
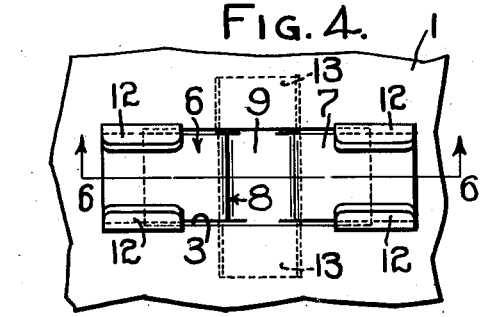
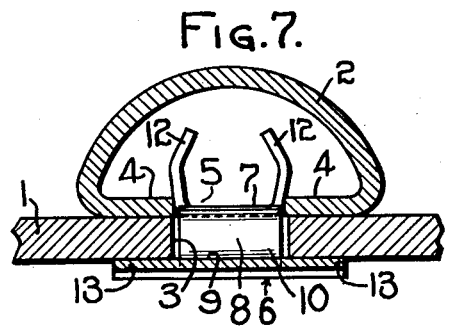
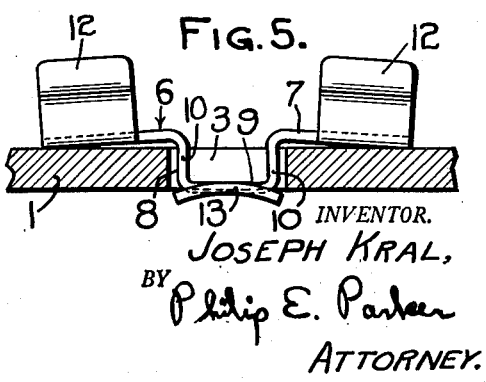
INVENTOR.
JOSEPH KRAL,
BY Philip E. Parker
ATTORNEY.

Patented Oct. 28, 1952

2,615,226

UNITED STATES PATENT OFFICE 2,615,226

TURN-IN STUD MOUNTING MOLDING SNAP FASTENER

Joseph Kral, Cambridge, Mass., assignor to United-Carr Fastener Corporation, Cambridge, Mass., a corporation of Massachusetts Application May 12, 1948, Serial No. 26,497

4 Claims. (Cl. 24—213)

The present invention relates to snap fastener installations of the type permitting two metal or rigid bodies to be fastened together, and the invention aims generally to improve existing snap fastener installations.

More particularly, the invention relates to an improved concealed snap fastener installation whereby hollow bodies, such as for example a channel shaped metal molding strip, may be quickly and securely attached to a suitable supporting surface.

In the drawing which illustrates a preferred embodiment of the invention:

Fig. 1 is a front elevation of a supported member connected to a metal supporting body, a portion of the supported member being broken away to show the fastener;

Fig. 2 is a perspective exploded view of the fastener, supporting member and supported member;

Fig. 3 is a front elevation of the supporting member showing the fastener in position for insertion into the supporting member;

Fig. 4 is a front elevation of the supporting member showing the fastener turned to locked position after insertion into the supporting member;

Fig. 5 is a cross-sectional view along line 5—5 of Fig. 3;

Fig. 6 is a cross-sectional view along line 6—6 of Fig. 4; and

Fig. 7 is a cross-sectional view of the complete installation along line 7—7 of Fig. 1.

The particular installation illustrated in the drawing comprises a supporting member 1 which may be of any form, as for example, a wall, ceiling or section of a vehicle body, to which it is desired to secure a hollow supported member 2, such as for example, conduit, molding strips, or the like. The supporting member 1 may be a sheet metal plate provided with apertures 3 for the reception of the fasteners, and the supported member may be in the form of a channel shaped molding strip having a hollow interior and inwardly extending side flanges 4 defining between them a slot 5.

According to the invention, I provide a fastener 6 preferably constructed of spring metal. The fastener 6 is preferably formed with a central base strip portion 7 with its central section formed into a U-shaped stud portion 8 with a base 9 and legs 10. The ends 11 of the base strip portion 7 extend outwardly normally at an angles less than 90 degrees from the terminal ends of the legs 10. On the side edges of each of the ends 11 of the base strip portion 7 are disposed opposed prongs 12. The prongs 12 are outwardly bowed to form a snap fastener stud at each end of the central base strip portion 7 extending in a direction therefrom opposite the U-shaped stud portion 8. Lugs 13 extend from opposite edges of the base 9 of the U-shaped stud portion substantially in the plane thereof. The lugs 13 may have an arcuate shape to permit easy movement of the upper surface thereof over the under surface of the supporting member 1.

The length of the legs 10 of the U-shaped stud portion 8 corresponds to the thickness of the supporting member 1 and the dimensions of the base 9 of the U-shaped stud portion 8 and the lugs 13 correspond with the dimensions of the aperture 3 in the supporting member 1 so as to permit easy insertion of the U-shaped stud portion 8 therein. The distance between opposite ends of the central base strip portion 7 of the fastener 6 is greater than the greatest dimension of the aperture 3 in the supporting member 1.

The U-shaped stud portion 8 together with the lugs 13 may be inserted into the aperture 3 of the supporting member 1, which aperture may be rectangular, and, turned through an angle of approximately 90 degrees so that the arcuate surfaces of the lugs engage the under surface of the supporting member 1 adjacent the longitudinal edges of aperture. In inserting the stud portion 8 into the aperture 3, the ends 11 of the base strip portion 7 are flexed so that they extend at an angle of 90 degrees from the legs 9 of the stud portion 8. After the fastener 6 has been turned into position with the lugs 13 in engagement with the under surface of the supporting member 1, the resilience of the fastener 6 holds the under surface of the ends 11 in engagement with the upper surface of the supporting member 1.

The slot 5 in the supported member 2 may then be forced down over the opposed prongs 12 which will pass therethrough and secure the retaining flanges 4 against the supporting member 1.

As will be apparent, the invention provides a fastener having opposed stud portions, one of which is inserted and turned into engagement with a supporting member 1 and the other of which provides for snap fastener engagement of a supported member 2.

The invention is particularly useful in providing simple means for quickly securing hollow members 2 such as a channel shaped molding strip to a supporting plate. In making such an installation one end of the fastener 6, for example the U-shaped stud 8 is inserted in an opening 3 in the supporting member 1 and turned to engagement, and when properly positioned therein the ends 11 of the central portion 7 serve to engage the opposite face of the supporting member 1. The channel-shaped molding strip 2 may then be readily forced down over the resilient prongs 12 and the installation is complete with the fastener concealed from view, as in Fig 1. It will, of course, be apparent that either end of the fastener may be positioned within the supporting member depending upon the size, shape and proportions of the supporting member, and that the shape and size of the fastener may be considerably varied to suit different conditions of the parts to be secured together. In any event I do not wish to be limited to the exact shapes of the fastener shown in Figs. 1 through 7.

The double fastener illustrated herein is simple in construction and very inexpensive to manufacture. It is obviously susceptible of various forms and shapes depending upon the shape and configuration of the parts to be connected.

While I have described a preferred embodiment of the invention, I do not wish to be limited thereby because the scope of the invention is best defined in the appended claims.

I claim:

1. A fastener for securing a hollow part to be supported having an opening therein to a support having an elongated aperture, comprising an elongated strip of resilient sheet material having spaced end portions and an intermediate U-shaped section connecting said end portions and including angularly disposed legs and an intermediate bight portion disposed below the planes of said end portions a distance substantially equal to the thickness of the support, the end portions of said strip being provided with outwardly bowed prongs extending substantially normal thereto from opposite side edges thereof and away from the U-shaped section providing spaced snap fastener stud members adapted for snap fastening engagement with an opening in the hollow part, and a support-engaging member extending laterally from the bight portion of said U-shaped section, said support-engaging member and bight portion having a combined elongated shape to be insertable through the aperture of the support and thereupon turned whereupon said spaced end portions and support-engaging member frictionally engage opposite faces of a support.

2. A fastener for securing a hollow part to be supported having an opening therein to a support having an elongated aperture, comprising an elongated strip of resilient sheet material having spaced end portions and an intermediate U-shaped section connecting said end portions and including angularly disposed legs and an intermediate bight portion disposed below the planes of said end portions a distance substantially equal to the thickness of the support, the end portions of said strip being provided with outwardly bowed prongs extending substantially normal thereto from opposite side edges thereof and in a direction away from the U-shaped section providing spaced snap fastener stud members adapted for snap fastening engagement with an opening in the hollow part, and support-engaging members extending laterally in opposite directions from the bight portion of said U-shaped section, said support-engaging members and bight portion having a combined dimension corresponding to the support aperture to be insertable therethrough and thereupon turned whereupon said spaced end portions and support-engaging members frictionally engage opposite faces of a support.

3. A fastener for securing a hollow part to be supported having an opening therein to a support having an elongated aperture, comprising an elongated strip of resilient sheet material having spaced end portions and an intermediate U-shaped section connecting said end portions and including leg portions extending from said end portions at an angle of less than 90 degrees and an intermediate bight portion disposed below the planes of said end portions a distance substantially equal to the thickness of the support, the end portions of said strip being provided with outwardly bowed prongs extending substantially normal thereto from opposite side edges thereof and in a direction away from the U-shaped section providing spaced snap fastener stud members adapted for snap fastening engagement with an opening in the hollow part, and a support-engaging member extending laterally from the bight portion of said U-shaped section, said support-engaging member and bight portion having a combined elongated shape to be insertable through the aperture of the support and thereupon turned whereupon said spaced end portions and support-engaging member frictionally engage opposite faces of a support.

4. A fastener for securing a hollow part to be supported having an opening therein to a support having an elongated aperture, comprising an elongated strip of resilient sheet material having spaced end portions and an intermediate transversely offset section, said transversely offset section including legs extending angularly to said end portions and a head portion disposed in a plane substantially parallel to but spaced transversely from said end portions, each of said spaced end portions being provided with a pair of outwardly bowed snap fastener elements extending substantially normal to said end portions and in a direction opposite the transversely offset section and adapted for snap fastening engagement with an opening in the hollow part, and a support-engaging lug extending laterally from the head portion of the transversely offset section and providing therewith a member of elongated shape to be insertable through the elongated opening in the support and thereupon turned whereupon said lug and spaced end portions frictionally engage opposite faces of a support.

JOSEPH KRAL.

REFERENCES CITED

The following references are of record in the file of this patent:

UNITED STATES PATENTS

| Number | Name | Date |
|---|---|---|
| 2,055,427 | Churchill | Sept. 22, 1936 |
| 2,084,717 | Wiley | June 22, 1937 |
| 2,187,322 | Jones | Jan. 16, 1940 |
| 2,188,026 | Wiley | Jan. 23, 1940 |
| 2,201,335 | Cotter | May 21, 1940 |
| 2,229,802 | Dyresen | Jan. 28, 1941 |
| 2,305,122 | Wiley | Dec. 15, 1942 |
| 2,315,211 | Kost | Mar. 30, 1943 |